United States Patent

[11] 3,566,012

[72] Inventors Harry E. Smithgall; Kenneth Speigel, Seneca Falls, N.Y.

[21] Appl. No. 734,492
[22] Filed June 4, 1968
[45] Patented Feb. 23, 1971
[73] Assignee Sylvania Electric Products Inc.

[54] DISPLAY DEVICE UTILIZING A FLYING SPOT SCANNER AND A COLOR CATHODE RAY TUBE
8 Claims, 2 Drawing Figs.

[52] U.S. Cl. .......... 178/5.2
[51] Int. Cl. .......... H04n 7/18, H04n 9/16
[50] Field of Search .......... 178/7.2, 5.2 (A), 6.8, 5.4 (STC), 5.4 (DS), 5.2 (D); 313/92 (PH)

[56] References Cited

UNITED STATES PATENTS

| | | | |
|---|---|---|---|
| 2,318,118 | 5/1943 | Warner et al. .......... | 178/5.6 |
| 2,757,571 | 8/1956 | Loughren .......... | 178/5.2 |
| 3,123,666 | 3/1964 | Bailey .......... | 178/5.2 |
| 3,128,333 | 4/1964 | Loughlin .......... | 178/5.2 |
| 3,131,254 | 4/1964 | Billard et al. .......... | 178/7.2 |
| 3,459,885 | 8/1969 | Goldmark et al. .......... | 178/5.4 |

OTHER REFERENCES

H. W. Leverenz, An Introduction To Luminescence of Socias, 1950, Wiley and Sons, Inc. pages 333,334,350 & 411

G. Blasse, A New Phosphor . . . $Y_3Al_5O_{12}-Ce^{3+}$ Applied Physics Letters, Vol. 11, No. 2, 15 July 1967, pp. 53–54

*Primary Examiner*—Richard Murray
*Assistant Examiner*—John C. Martin
*Attorneys*—Norman J. O'Malley, Cyril A. Krenzer and William H. McNeill

ABSTRACT: The combination of a color television receiver and a display system for presenting slide transparencies, movies or other image mediums upon the color cathode ray tube of the television receiver. The slide or other medium is scanned by a flying spot cathode ray tube which, in conjunction with dichroic mirrors and suitable filters separates the information derived from the scan of the medium into its representative color components, translates the representative color components into processed electrical signals and couples the processed signals directly to appropriate electrodes of the color cathode ray tube.

The flying spot cathode ray tube is provided with a fixed focus and has a screen comprised of an admixture of $Y_3Al_5O_{12}$:Ce and $Ca_2Al_2SiO_7$:Ce phosphors in approximately the ratio of 3 to 1 by weight. Also disclosed as an alternate for $Ca_2Al_2SiO_7$:Ce is ZnS:Ag:Ni.

PATENTED FEB 23 1971

3,566,012

INVENTORS
HARRY E. SMITHGALL &
KENNETH SPEIGEL

BY

Cyril C. Kruger

ATTORNEY

DISPLAY DEVICE UTILIZING A FLYING SPOT SCANNER AND A COLOR CATHODE RAY TUBE

CROSS REFERENCES TO RELATED APPLICATIONS

For a description of one method of achieving proper synchronization between the color cathode ray tube and the flying spot cathode ray tube as well as particular processing apparatus and procedures for the translated electrical signals, reference is directed to U.S. Pat. Application Ser. No. 657,623, which is assigned to the assignee of the present invention.

BACKGROUND OF THE INVENTION

This invention relates to systems for presenting slides, movies or other image-carrying pictorial representations upon the picture tube of a television receiver and more particularly to that part of the system engaged in providing a suitable spectral energy distribution compatible with the color information on the image and in separating the image into its distinct color components and translating these color components into electrical signals; still more specifically the invention is concerned with a flying spot-scanning cathode ray tube suitable for use within this system.

The need for an adequate pictorial or informational display system capable of amplifying in size a particular representation and presenting it for simultaneous viewing by a number of persons has been a prevalent one.

Perhaps the best known system currently available is the common slide or movie projector. Both of these devices are so well understood in their respective principles of operation that a detailed discussion is not essential here; however, both devices operate generally by utilizing a powerful light source and beaming this light through a transparent slide or frame of movie film and thence through one or more lenses to project the image on a screen. Both systems have several inherent disadvantages, namely; regardless of the power of the light source it is almost imperative to operate the systems in partial or total darkness in order to present an acceptable picture on the screen; and, also, the power required by the light source of necessity generates a tremendous amount of heat which must be dissipated by vents, louvers, fans, etc. Additionally, in a slide projector, the excess heat not fully dissipated may cause warpage and subsequent destruction of the slide when it is presented to the projection system for long periods of time. Further, such a system requires setup and takedown of separate pieces of apparatus, screens, projectors, etc. not normally part of the household furniture arrangement.

Another presentation system which has received interest in the recent past is the video tape recorder. The system utilizes a small television camera which records what it sees on video tape which may then be played back through a conventional television receiver. This system is perfectly workable; however, because of the relatively high cost involved for a black and white home unit and even higher cost of a color unit, the system is still not practical as a mass market consumer product.

Yet another type of presentation system in use—which however has never before been capable of production for a mass consumer market—is a flying spot scanner device for reading slides and movies used in commercial television studios. In this system the flying spot tube is formed with a flat, hard glass, optically ground faceplate having variable focus characteristics and an unrealistic cost factor for incorporation in a mass market item and an objective lens of excellent quality and relatively high cost. This system operates by separating the scanned image on the slide or movie frame into its distinct color components, and translating the color information into electrical information, processing it to achieve a desired signal, and feeding the signal to a transmitter for distribution over the air by conventional broadcast techniques. This studio equipment is tremendously expensive and sophisticated and is completely impractical for conversion to a home user type of market.

OBJECTS AND SUMMARY OF THE INVENTION

It is, therefore, an object of this invention to obviate the disadvantages of the prior art.

It is another object of the invention to enhance presentation systems.

Still another object of the invention is the provision of a display system for presenting slides, movies, or other indicia bearing mediums under ambient light conditions.

Yet another object of the invention is to provide such a system that is economical to purchase and use.

Yet another object of the invention is the provision, within the context of the system, of an economical, fixed focus, flying spot scanner tube having an optimized spectral energy distribution well suited to the type of display.

Still another object of the invention is the provision of a flying spot scanner tube having ideal resolution and a suitable decay rate for compatibility with a television receiver.

Yet another object of the invention is the provision of a system as described above having a cost well within the capability of the typical consumer market.

These and other objects are accomplished in one aspect of the invention by the provision of the combination of a color television receiver and a display system for presenting a pictorial representation having an image thereon upon the screen of the color cathode ray tube of the receiver. Means are provided for presenting the pictorial representation to an optical reader and for optically reading the information presented thereto. The information derived from the optical reading is separated into its distinct color components and fed through apparatus which processes the distinct color components into processed electrical signals containing desired information. The finally processed electrical signals are then directly coupled to the receiver and applied to appropriate electrodes of the color cathode ray tube and the image is presented thereon.

DESCRIPTION OF THE PREFERRED EMBODIMENTS

Figures 1, 2:
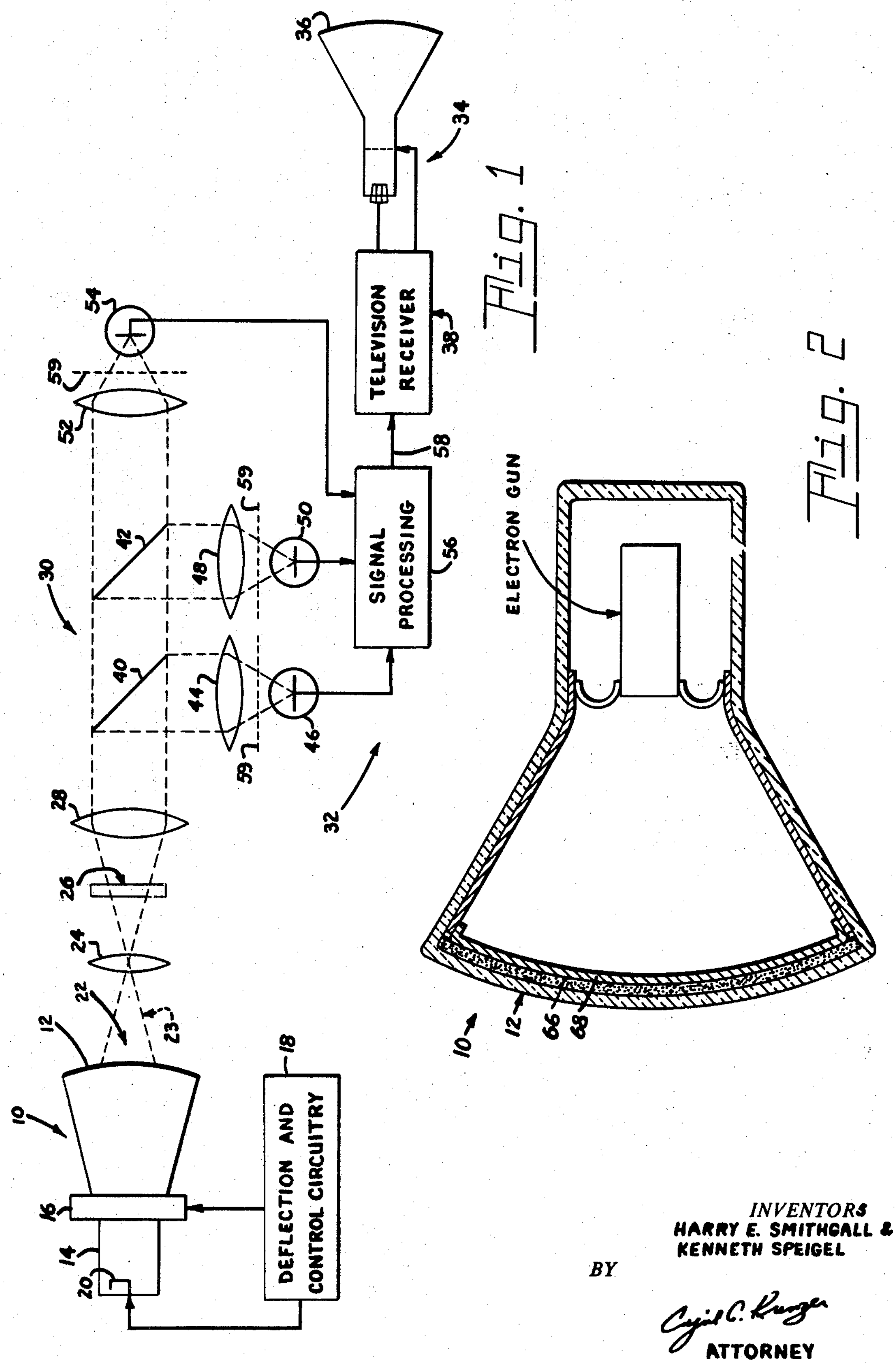
FIG. 1 is a diagrammatic illustration of the combination of a television receiver and a display system.
FIG. 2 is a sectional view of a flying spot scanner cathode ray tube constructed in accordance with the invention.

For a better understanding of the present invention, together with other and further objects, advantages and capabilities thereof, reference is made to the following disclosure and appended claims in connection with the above-described drawings.

Referring now to the drawings with greater particularity, there is shown a system which includes an optical reader here shown as a flying spot scanner cathode ray tube 10 having a curved face plate 12 formed of soft glass. Tube 10 will be described in greater detail hereinafter. Mounted on the neck 14 of tube 10 is a suitable deflection apparatus 16 to which are applied deflection and control signals from the deflection and control circuitry 18. The deflection and control circuitry also provides a signal input to the cathode element 20 of tube 10. Generally only a selected portion 22 of the face plate is employed to generate a moving beam of light 23. The moving beam of light 23 passes through an objective lens or lens system 24 which operates to focus the beam 23 on the pictorial representation 26 (which may be a frame of film) which is presented to the optical reader by suitable means. In this instance, the beam of light 23 passes through the pictorial representation 26, which may be in the form of a slide transparency or a frame of movie film and is collected by a condensing lens 28 and directed toward a color separation system 30 which operates to separate the light beam 23 into the distinct color components represented thereby. As illustrated the distinct color components are then treated by means shown generally as 32 to translate the optically formed representative color components into processed electrical signals containing desired information. Means 58 are then provided for directly coupling the processed signals to the receiver 38 and appropriate electrodes of the color cathode ray tube 36.

System 30 for separating the beam of light 23 includes first and second dichroic mirrors 40 and 42. The dichroic mirror 40 selectively reflects one color component of the beam (e.g. red having a wavelength between about 6100 to 6500 A.) and directs it toward a secondary condensing lens 44 which collects the light and directs it toward a photosensitive pickup device 46, such, for example, as a photomultiplier tube.

The remaining portion of the light incident upon the dichroic mirror 40 passes therethrough and strikes dichroic mirror 42. In similar fashion mirror 42 selectively reflects a portion of the light representing a color component, (e.g. blue having a wavelength between about 4,100 to 4,500 A.) toward another secondary condensing lens 48 which directs the light therethrough toward a photosensitive pickup device 50.

The remaining light passing through mirror 42 is collected by still another secondary condensing lens 52 which directs the light, representing a third color component of the image (e.g. green having a wavelength between about 5,100 to 5,500 A.) toward a third photosensitive pickup device 54. The photosensitive pickup devices 46, 50, and 54 respond to the light intensities respectively incident thereon and produce electrical signal outputs bearing a fixed relation to such intensity. The electrical signal outputs from the pickup devices are applied to suitable processing circuitry 56 which translates the received signals to produce output signals at 58 which are compatible with television receiver 38 to permit reproduction thereby of the pictorial representation 26 being scanned on the color television picture tube 36. A form of signal-processing equipment adapted to provide the necessary signal translation is shown and described in Ser. No. 657,623, referred to above.

If additional color selectivity is required, suitable filters 59 may be interposed between the various secondary condensing lenses and their associated pickup devices.

Referring now to FIG. 2 there is disclosed a flying spot scanner cathode ray tube 10 of unique and economical construction for use within this system.

As mentioned above, for such a presentation system to be readily available to the mass market consuming public, cost is an essential factor. The tube here presented fits this parameter ideally as well as providing the necessary spectral and electrical characteristics essential to performance.

Specifically, tube 10 has a spherical face plate 12 of soft glass and having a light transmission of between 85 percent and 95 percent. The spherical faceplate provides a substantially fixed focus and allows utilization of a relatively inexpensive objective lens or lens system. Disposed on the interior surface of the faceplate is a phosphor system 66 providing a spectral energy distribution encompassing at least the wavelengths of between 4,100 to 4,500 A; 5,100 to 5,500 A; and 6,100 to 6,500 A. A specific embodiment of the invention utilizes the center wavelengths of 4,400 A; 5,300 A; and 6,200 A. To be compatible with the color picture tube 36 of the receiver 38 the phosphor system has a decay rate of the order of .13 to .5 microseconds at 10 percent and 1 percent respectively of initial intensity.

The phosphor system now contemplated is comprised of a mixture of $Y_3Al_5O_{12}$:Ce and $Ca_2Al_2SiO_7$:Ce in approximately the ratio of 3:1. The $Y_3Al_5O_{12}$:Ce is a yellow-emitting phosphor under cathode ray excitation and has a broad spectral response including both green and red regions of the spectrum. The $Ca_2Al_2SiO_7$:Ce provides blue emission within the required range. The mixture of the two phosphors is rather critical because of the vast disparity between their respective efficiencies.

For example, a solid screen of the $Y_3Al_5O_{12}$:Ce phosphor has a light output of approximately 300 feet lamberts, whereas a solid screen of the blue-emitting $Ca_2Al_2SiO_7$:Ce has a maximum brightness of approximately 15 feet lamberts. Thus incorporating too much of the blue-emitting phosphor into the system can drastically reduce light output.

The mixture of the two phosphors is rather critical because of the need for a balance between the three colors and because of the nature of mixed-phosphor screens. At a given screen weight (coverage) the total weight of the phosphor in the screen is a fixed quantity. An excessive increase in the yellow phosphor requires a similar reduction in the blue phosphor which results in insufficient blue in the final display. Conversely, incorporating too much blue-emitting phosphor into the system reduces the yellow phosphor present and results in insufficient red in the final display.

The recommended ratio of mix of approximately 3:1 to 4:1 of the $Y_3Al_5O_{12}$and $Ca_2Al_2SiO_7$:Ce respectively provides sufficient spectral response of the three primaries and provides a screen having a brightness in the neighborhood of 200—250 feet lamberts, which is more than adequate for most purposes. The above-described phosphor system has previously been suggested in an article entitled "A New Phosphor for Flying-Spot Cathode Ray Tubes for Color Television: Yellow Emitting $Y_3A_5O_{12}$—$Ce^{+3}$" which appeared in "Applied Physics Letters," Volume 11, Number 2 on Jul. 15, 1967.

Of further importance to the production of a suitable flying spot tube is the resolution obtainable therewith since this has a direct bearing on the quality of the picture ultimately presented on tube 36. To assure good resolution the phosphor system should have an average particle size of between 2.5 and 6 microns; as measured by the Fisher Sub-Sieve Sizer, preferably about 4.5 microns. To insure maximum efficiency and minimum light loss because of dispersion through the phosphor a substantially monolayer screen is required. To further increase brightness and reduce ion burn the screen is preferably aluminized as at 68 by techniques well understood in the art.

An alternative blue-emitting phosphor that may be utilized in place of the $Ca_2Al_2SiO_7$:Ce is a silver-activated zinc sulfide poisoned with nickel (ZnS:Ag:Ni). This phosphor peaks in the proper region (4,400 A) and has the proper decay time; however, its lack of efficiency because of the nickel poisoning requires additional amplification stages in the electrical signal processing.

Thus, there has been provided by this invention a pictorial or informational display system capable of amplifying in size a particular representation and presenting it for simultaneous viewing by a number of persons which has none of the disadvantages of the prior art. It is a greatly enhanced system which allows presentation of slides, movies, or other indicia bearing mediums under ambient light conditions. It permits the viewer to improve the photographed image by increasing the brightness of the television set or by increasing individual component colors as desired. The cost is reasonable and well within the range of the mass market consuming public. The fixed focus system, derived from the spherical faceplate of the flying spot scanner tube together with the economical objective lens provides a substantial freedom of adjustment; a most necessary feature for a sophisticated piece of equipment designed for public consumption. The resolution and spectral energy distributions of the flying spot tube are well matched to the spectral range of color transparencies and the capabilities of the color receiver and picture tube.

While there has been shown and described what are at present considered the preferred embodiments of the invention, it will be obvious to those skilled in the art that various changes and modifications may be made therein without departing from the scope of the invention as defined by the appended claims.

We claim:

1. In combination, a color television receiver and a display system for presenting a pictorial representation having an image thereon upon the screen of the color cathode ray tube of said receiver, means presenting said pictorial representation to an optical reader, means for optically reading said image on said pictorial representation, means for separating information derived from said reading into the distinct color components represented thereby, means for translating said optically formed representative color components into processed electrical signals containing desired information, and means directly coupling said processed signals to appropriate electrodes of said color cathode ray tube, said means for optically reading said image on said pictorial representation comprising: a flying spot-scanning cathode ray tube having a curved faceplate and providing a substantially fixed focus; a phosphor system disposed upon the interior surface of said curved faceplate and providing, upon energization, a given spectral energy distribution and having a decay rate of the order of .13 to .5 microseconds, said given spectral energy distribution including at least areas corresponding to wavelengths of 4,100 to 4,500 A, 5,100 to 5,500 A, and 6,100 to 6,500 A.

2. The invention of claim 1 wherein said phosphor system comprises a substantially monolayer screen of phosphor particles.

3. The invention of claim 2 wherein said phosphors have an average particle size between 2.5 and 6 microns in diameter.

4. The invention of claim 3 wherein said faceplate has a spectral energy transmission rate of between 85 percent and 95 percent.

5. The invention of claim 1 wherein said phosphor system comprises a substantially homogeneous admixture of 65 percent to 85 percent of a first phosphor and the remainder of a second phosphor.

6. The invention of claim 5 wherein said first phosphor provides said areas of spectral energy encompassing the wavelengths of 5,100 to 5,500 A and 6,100 to 6,500 A.

7. The invention of claim 6 wherein said first phosphor is $Y_3A1_50$:Ce.

8. The invention of claim 7 wherein said second phosphor is chosen from the group consisting of $Ca_2A1_2SiO_7$:Ce and ZnS:Aq:Ni.

PO-1050
(5/69)

UNITED STATES PATENT OFFICE
CERTIFICATE OF CORRECTION

Patent No. 3,566,012 Dated February 23, 1971

Inventor(s) Harry E. Smithgall and Kenneth Speigel

It is certified that error appears in the above-identified patent and that said Letters Patent are hereby corrected as shown below:

Column 6, line 15 of the Claims (claim 7) "$Y_3Al_5O$:Ce." should read--$Y_3Al_5O_{12}$:Ce.

Column 6, line 18 of Claim 8 "ZnS:Aq:Ni." should read-- ZnS:Ag:Ni.--

Signed and sealed this 29th day of June 1971.

(SEAL)
Attest:

EDWARD M.FLETCHER,JR.
Attesting Officer

WILLIAM E. SCHUYLER, JR.
Commissioner of Patents